R. C. PESSELL.
GRADER FOR POTATOES, ROOTS, AND FRUIT.
APPLICATION FILED MAR. 28, 1919.
1,438,783.
Patented Dec. 12, 1922.
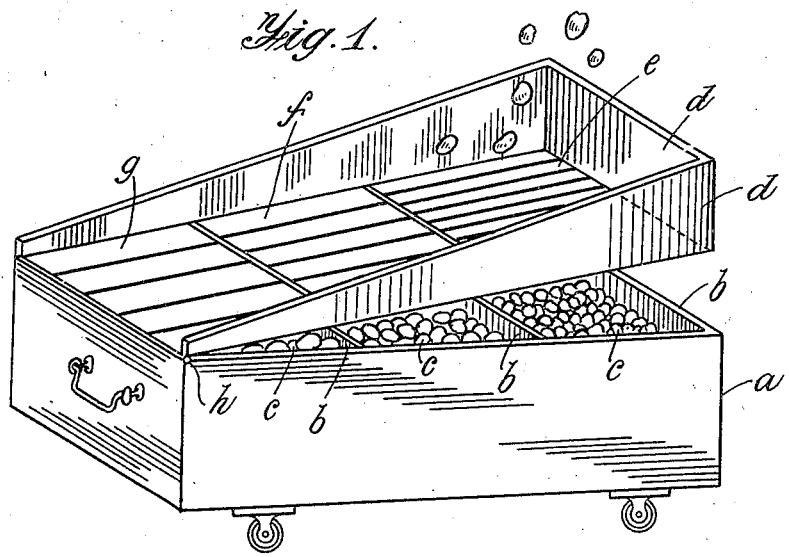
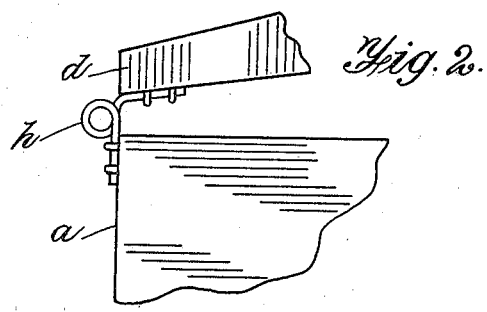
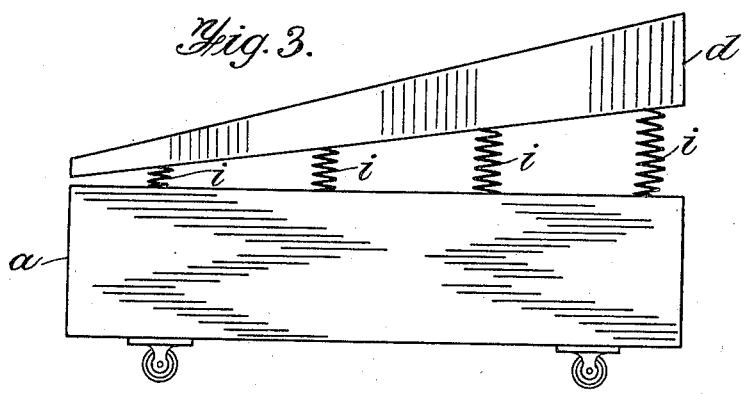
Inventor:
R. C. Pessell
by Henry T. Bright
atty.

Patented Dec. 12, 1922.

1,438,783

UNITED STATES PATENT OFFICE.

ROBERT CHARLES PESSELL, OF BOURNEMOUTH, ENGLAND.

GRADER FOR POTATOES, ROOTS, AND FRUIT.

Application filed March 28, 1919. Serial No. 285,941.

*To all whom it may concern:*

Be it known that I, ROBERT CHARLES PESSELL, a subject of the King of Great Britain, residing at Bournemouth, Hampshire, England, have invented new and useful Improvements in Graders for Potatoes, Roots, and Fruit, of which the following is a specification.

This invention relates to apparatus made use of in sorting or grading potatoes or other roots and fruit according to size, and has for its object to provide a portable appliance for the purpose which, as it receives the roots, fruits, or the like, will automatically separate them and deliver them into receptacles for the respective classes.

At present the method usually employed is to collect the potatoes or the like into sacks or receptacles at the places where they have been gathered and after conveyance to the sheds, to grade them according to size and requirements by manual labor; or by appliances constructed for the purpose but which also requires manual labor for their operation. By my invention this additional labor is dispensed with.

The automatic grader, in accordance with this invention, consists of a box, or wicker basket, divided by partitions into a required number of compartments, and having a perforated cover—the openings in which correspond with the desired grades—slightly higher at one end than the other, which cover is connected to the box by means of spring hinges, or is mounted on springs interposed between the under surface of the cover and the upper edge of the box.

In operation the roots or fruit are graded at the time, and at the place, where they are gathered, the gatherer casting them into the higher end of the cover on the box or basket whence they gravitate towards the lower end falling through the various sized apertures into the compartments of the box or basket intended for them, the smallest sized falling through the openings in the higher end of the cover, the medium size through those in the centre, and the largest through those in the lower end of the cover.

The spring mountings of the cover permit of said cover vibrating under the impact of the roots or the like when thrown therein, and thus any liability of the larger size potatoes or the like lodging in the smaller holes is prevented.

And in order that my invention may be fully understood I will now describe same with reference to the accompanying drawings and figures and letters of reference marked thereon, that is to say:—

Fig. 1 is a perspective view of a grader constructed in accordance with my invention, and Figs. 2 and 3 are detailed views illustrating different types of spring mountings for the perforated cover.

$a$ is a box which may be of any convenient size and shape, divided by partitions $b$ into any required number of compartments $c$.

In the drawing said box $a$ is shown as being of three compartments suitable particularly for the grading of potatoes, but it is to be understood that said compartments may be increased and adjusted to suit the character of the crop.

A cover—preferably removable—is provided for the box $a$ with openings of various sizes therein to correspond with the desired grades into which the crop is to be sorted. This cover is fitted with a rim $d$ around its edge to prevent the roots falling over the sides, and is slightly inclined from end to end, so that when the roots or the like are cast upon the raised end gravity carries them downwards.

The smaller openings $e$ are formed at the higher end of the cover; the medium sized holes $f$ in the centre, and the largest sized $g$ at the lower end. The openings may be made in various ways either, as shown, by laths with spaces between which increase in width toward the lower end; or by holes of increasing size cut in the cover; or, again the cover may be made of a lattice arranged so as to be extended in a manner to vary the size of the apertures to suit the varieties of roots being handled, the compartments of the box corresponding with the divisions or apertures in the cover.

A wicker basket may be used instead of the box above described, and will be found especially useful for grading fruits.

In use the box or basket is taken by the individual whose duty it is to gather the roots or fruit, to the field or orchard, and said roots or fruit as gathered are thrown on to the higher end of the cover of said box or basket, (which for convenience is placed nearer the gatherer) in the same way as they would be cast into the sack or basket usually employed.

The potatoes or other roots, or fruit, then gravitate towards the lower end and fall into the compartments intended for them.

It will be seen that the roots or fruit are thus graded without more effort than that usually required to gather them. When the box or basket is full it is removed to the storage shed, and the cover or lid can be removed and used to repeat the filtering as the gathered crop is being removed from the cart, and this process can be repeated as many times as desired.

To facilitate its movement from one place to another the box or basket may be mounted on wheels.

The cover, though shown flat, may be curved or funnel shaped, or tubular, as desired.

In Fig. 2 $h$ indicates a spring hinge by which the cover is connected to the box $a$ which while maintaining the cover normally at a desired inclination will permit of its free vibrations when impact is made by the roots or the like cast thereon, thus preventing any liability of such roots or the like catching or resting on the meshes of the cover. This object may also be obtained by mounting the cover on springs $i$ interposed between the cover and the upper edges of the box $a$.

Having fully described my invention, what I claim as new and desire to secure by Letters Patent of the United States is:—

A potato grading apparatus comprising a box divided into compartments, a potato receiving trough above the box with its bottom normally inclined to the top of the latter, said trough having its bottom formed of parallel spaced slats dividing the same into areas harmonizing in extent with the compartments of the box, the spacing of the slats of the areas increasing with respect to each other from the receiving end of the trough towards its other end.

In testimony whereof I have signed my name to this specification in the presence of two subscribing witnesses.

ROBERT CHARLES PESSELL.

Witnesses:
 C. L. HUGHES,
 G. HUGHES.